United States Patent [19]

Huynh-Tran et al.

[11] Patent Number: 5,284,918

[45] Date of Patent: Feb. 8, 1994

[54] ONE PACKAGE POLYURETHANE/THERMOPLAST PLASTISOL COMPOSITION

[75] Inventors: Truc-Chi T. Huynh-Tran, Burtonsville, Md.; Felek Jachimowicz, Brookline, Mass.; Alexander C. Paton, Bedford, Mass.

[73] Assignee: W. R. Grace & Co.-Conn., New York, N.Y.

[21] Appl. No.: 694,524

[22] Filed: May 1, 1991

[51] Int. Cl.$^5$ .................. C08L 75/08; C08G 18/80; B05D 1/00
[52] U.S. Cl. ........................... 525/124; 528/45; 427/388.1; 524/196; 524/197; 524/198; 524/199; 524/200
[58] Field of Search ................. 525/124; 528/45; 427/388.1; 524/196, 197, 198, 199, 200

[56] References Cited

U.S. PATENT DOCUMENTS

| | | | |
|---|---|---|---|
| 3,660,355 | 5/1972 | Johnson et al. | 525/124 |
| 3,676,402 | 7/1972 | Matsui et al. | 528/45 |
| 3,694,389 | 9/1972 | Levy | 528/45 |
| 3,857,818 | 12/1974 | Frizelle | 525/124 |
| 3,947,426 | 3/1976 | Lander | 525/61 |
| 3,984,365 | 10/1976 | Lienert et al. | 528/45 |
| 4,046,744 | 9/1977 | Jenkins | 528/45 |
| 4,101,473 | 7/1978 | Lander | 524/589 |
| 4,373,081 | 2/1983 | Nachtkamp et al. | 528/45 |
| 4,403,086 | 9/1983 | Holubka et al. | 528/45 |
| 4,409,340 | 10/1983 | Stolzenbach et al. | 528/45 |
| 4,546,166 | 10/1985 | Niinomi et al. | 528/60 |
| 4,590,254 | 5/1986 | Chang et al. | 528/64 |
| 4,623,686 | 11/1986 | Hurnik et al. | 528/45 |
| 4,624,996 | 11/1986 | Rizk et al. | 528/45 |
| 4,696,991 | 9/1987 | Kobayashi et al. | 528/45 |
| 4,722,969 | 2/1988 | Huynh-Tran et al. | 525/124 |
| 4,725,661 | 2/1988 | Miyabayashi | 528/45 |
| 4,748,200 | 5/1988 | Nasu | 528/45 |
| 4,761,465 | 8/1988 | Speranza et al. | 528/45 |
| 4,806,585 | 2/1989 | Nakayama et al. | 524/376 |
| 4,818,791 | 4/1989 | Murakami et al. | 525/124 |
| 4,824,925 | 4/1989 | Kamarchik, Jr. et al. | 528/45 |
| 4,841,008 | 6/1989 | Tsukamoto et al. | 528/45 |
| 4,870,142 | 9/1989 | Czerwinski et al. | 525/528 |
| 4,880,891 | 11/1989 | Miyabayashi et al. | 528/45 |
| 4,889,908 | 12/1989 | Franke et al. | 524/762 |
| 4,900,415 | 2/1990 | Chung et al. | 528/45 |
| 4,983,655 | 1/1991 | Nakata et al. | 528/73 |
| 4,997,900 | 3/1991 | Brinkman | 528/45 |
| 5,010,160 | 4/1991 | Speranza et al. | 528/45 |
| 5,049,249 | 9/1991 | Chung et al. | 528/45 |
| 5,055,522 | 10/1991 | Ikeda et al. | 525/124 |
| 5,130,402 | 7/1992 | Akiyama et al. | 528/45 |
| 5,155,154 | 10/1992 | Krummel et al. | 524/197 |

FOREIGN PATENT DOCUMENTS

| | | | |
|---|---|---|---|
| 3228670 | 2/1984 | Fed. Rep. of Germany | |
| 55-118948 | 9/1980 | Japan | 525/124 |
| 56-024435 | 3/1981 | Japan | 525/124 |
| 57-165442 | 10/1982 | Japan | 525/124 |

Primary Examiner—John Kight, III
Assistant Examiner—Rabon Sergent
Attorney, Agent, or Firm—Valerie E. Looper

[57] ABSTRACT

A reactive plastisol composition includes a one component, solventless, storage stable, low temperature curable polyurethane composition and a thermoplast plastisol. The urethane composition is formed from a blocked isocyanate prepolymer and a curing agent. The isocyanate prepolymer is the reaction product of a polyol, a diisocyanate, and a ketoxime blocking agent. The diisocyanate has the formula

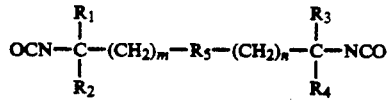

in which $R_1$-$R_4$ are each a $C_1$-$C_6$ alkyl which can be linear or branched, $R_5$ is a phenylene or naphthalene ring which is unsubstituted or substituted by one or more $C_1$-$C_{12}$ linear or branched chained alkyl groups or halo groups, and m and n are each integers from 0 to 6. A polyurethane curing catalyst can also be used.

29 Claims, No Drawings

ONE PACKAGE POLYURETHANE/THERMOPLAST PLASTISOL COMPOSITION

BACKGROUND OF THE INVENTION

This invention relates to a composition and process for forming a storage-stable, one package, blocked polyurethane which is highly compatible with thermoplast plastisols such as polyvinylchloride (PVC) and polymethylmethacrylate (PMMA) plastisols.

Thermoplast plastisols are commonly used in the automotive industry as sealants and underbody coatings. A preferred use is as a secondary coating applied over a primary coating formed by electrodeposition (E-coat). The secondary coating provides additional corrosion protection and coverage over areas missed by the electrodeposition process.

In order to develop the full strength of the plastisols so that they can be useful, they generally require baking temperatures of 130° C. or higher. Due to the increased use of automotive plastic parts which have lower service temperatures and also for energy conservation purposes, the recent trend has been to drop the oven baking temperatures in automotive plants to 120° C. or lower. At these lower baking temperatures, plastisols that are storage stable cannot develop their full strength due to poor fluxing (i.e., plasticization), and hence they are poorly adherent to E-coats and generally have poor abrasion resistance. Plastisols that can develop full strength at low bake temperatures, however, do not provide any adhesion and generally are not storage stable.

In order to improve processing characteristics, it is known in the art to blend thermoplast plastisols with polyurethanes. The polyurethanes used, however, are not highly compatible with the plastisols, are generally not storage-stable, and do not provide improved abrasion resistance and adhesion when the blends are baked at lower temperatures such as 120° C.

Examples of blocked isocyanate compositions can be found in various patents. These include U.S. Pat. No. 3,583,943, which teaches a curable coating composition comprising (a) a ketoxime-blocked, isocyanate terminated reaction product of a polyhydroxyl compound with an isocyanate, the reaction product having a molecular weight of from about 8,000 to about 15,000 and (b) a tertiary amino alcohol having at least two hydroxyl groups.

U.S. Pat. No. 3,694,389 teaches a thermosetting coating composition comprising a ketoxime-blocked isocyanate and a solution copolymer of a mixture of ethylenically unsaturated and active hydrogen-containing compounds. U.S. Pat. No. 3,660,355 teaches novel thermosetting resin powders which can be molded to form urethane cross-linked products which are prepared by reacting hydroxy-functional, acrylic polymer particles with a mono-blocked diisocyanate. U.S. Pat. No. 3,676,402 teaches octaalkylstannoxanes as regenerative agents of an isocyanate group and a blocked isocyanate compound at temperatures lower than previously possible.

U.S. Pat. No. 3,857,818 teaches a powdered coating composition comprising a free flowing mixture of a solid, ketoxime-blocked isocyanate prepolymer and one or more solid, hydroxy functional resins such as a polyester resin. U.S. Pat. No. 3,984,365 teaches an aqueous solution of bisulfate-blocked polyisocyanate prepolymers having storage stability up to about 45° C. by incorporation of about 0.5 to 20% by weight of the prepolymer of an aromatic or alkyl aromatic, sulfonic acid. U.S. Pat. No. 4,046,744 teaches a low temperature, one component, thermosetting coating composition comprising a ketoxime-blocked polyisocyanate and an oxazolidine.

U.S. Pat. No. 4,403,086 teaches high solid, solvent-based thermosetting resin coating compositions comprising chain-extendable, cross-linkable, low molecular weight polyol, deblocked diisocyanate and cross-linking agent reactive with a polyol, but substantially unreactive with the isocyanate functionality. U.S. Pat. No. 4,409,340 teaches a heat curable, coating composition comprising a prepolymer with ketoxime-blocked NCO groups which are linked to the prepolymer via cycloaliphatic and/or aliphatic groups, a diamine cross-linker and an organic solvent. U.S. Pat. No. 4,373,081 teaches thermally cross-linkable, coating compositions which are liquid and storage stable at room temperature and which contain combinations of dialkyl-malonate-blocked polyisocyanates and organic polyhydroxyl compounds as binders.

U.S. Pat. No. 4,696,991 relates to blocked isocyanurates which are curable at low temperatures to form coatings. The blocking agent can be an oxime.

Patents disclosing low temperature cure include U.S. Pat. No. 4,546,166 and German Offenlegungsschrift DE No. 32 28 670. However, most of the compositions cited do not provide sufficient shelf life. For instance, in U.S. Pat. No. 4,546,166, although it is disclosed that the polyurethane composition can be cured at 80°-100° C., the cure time is two to four hours and the composition is not storage stable because the polyisocyanates used are not blocked. In a case where storage stability is disclosed (for 2 months at room temperature) in German Offenlegungsschrift DE No. 32 28 670, the curing temperature is significantly higher, i.e., 140° C., for 20 minutes.

Blocked isocyanates prepared from m-xylylene diisocyanate are known as taught by U.S. Pat. No. 4,824,925. This patent discloses blocked isocyanate curing agents prepared by reacting m-xylylene diisocyanate with a ketoxime. The curing agents are used in combination with active hydrogen-containing materials to form curable compositions such as coatings. This patent does not teach combining a blocked polyurethane prepolymer with a plastisol.

U.S. Pat. No. 4,623,686 relates to coating compositions which include polyvinyl plastisols, polyisocyanates with retarded activity, and one or more plasticizers. The polyisocyanates are used as bonding agents for the plastisols.

The use of an amine curing agent is taught by U.S. Pat. No. 4,624,996. This patent teaches a one package polyurethane composition in which a polyurethane prepolymer is blocked with an oxime. The prepolymer can be formed from one or more polyisocyanates. None of the polyisocyanates mentioned are hindered polyisocyanates and there is no disclosure that the use of hindered polyisocyanates provides any improved result. This patent also does not disclose the use of thermoplast plastisol compositions.

Prior art systems have been developed which improve the performance of PVC plastisols at lower curing temperatures. For example, U.S. Pat. No. 4,722,969 relates to blocked urethane compositions which, when blended with plastisols, allows curing of plastisol coatings at temperatures of 100°–120° C. for 10–30 minutes. In addition, the blends are storage stable for at least 3 days at 40° C. or for 2 months at room temperature, i.e., at 25° C. The polyurethanes of this patent are prepared from a branched isocyanate prepolymer blocked with a ketoxime blocker, a polyol cross-linking agent, a deblocking and curing catalyst and a desiccant to prevent foaming.

While plastisol blends prepared with the polyurethane compositions of U.S. Pat. No. 4,722,969 exhibit good and in some cases outstanding performance, there remains room for improvement in some respects. For example, the polyurethane compositions of this patent are not 100% compatible with PVC plastisols. Also, the use of an amine curing agent results in inadequate shelf life.

There thus remains a need in the art for a polyurethane composition which can form highly compatible blends with PVC and/or other thermoplast plastisols in proportions higher than 30 parts thermoplast per 100 parts polyurethane without substantial degradation of physical properties. Also there remains a need in the art for a polyurethane composition which can employ an amine curing agent while retaining adequate storage stability, i.e., shelf life.

These needs are met by the present invention.

SUMMARY OF THE INVENTION

It is accordingly an object of the present invention to provide a polyurethane composition that can be blended with a thermoplast plastisol and cured at temperatures such as 120° C. or less.

It is another object of the invention to provide a polyurethane composition, as above, which is highly compatible with a thermoplast plastisol.

It is yet another object of the invention to provide a polyurethane composition, as above, which can be used in a blend having a high percentage of thermoplast plastisol without substantial loss of physical properties such as abrasion resistance and adhesion to electrodeposition coatings, even when the blend is cured at reduced temperatures.

It is still another object of the invention to provide a polyurethane composition which employs an amine curing agent and yet retains acceptable storage stability.

It is yet another object of the invention to provide a one package polyurethane/thermoplast plastisol blend useful in automobile underbody coating applications, in which the blend has the above-described characteristics.

It is still another object of the invention to provide a method for coating a metal substrate with the above-described blend composition.

These objects are achieved by a reactive plastisol composition which includes (A) a one component, solventless, storage stable, low temperature curable polyurethane composition and (B) from about 2 to about 10,000 parts by weight for each 100 parts by weight component (A) of a thermoplast plastisol. The urethane composition includes a blocked, sterically hindered isocyanate prepolymer and a curing agent. The isocyanate prepolymer is the reaction product of a polyol, a diisocyanate and a ketoxime blocking agent. The diisocyanate has the formula

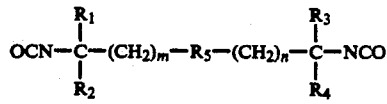

in which $R_1$–$R_4$ are each a $C_1$–$C_6$ alkyl which can be linear or branched, $R_5$ is a phenylene or naphthalene ring which is unsubstituted or substituted by one or more $C_1$–$C_{12}$ linear or branched chained alkyl groups or halo groups, and m and n are each integers from 0 to 6.

The objects of the invention are also achieved by a method for coating a metal substrate with the above described reactive plastisol composition. The method includes the steps of coating the substrate with the plastisol composition and curing the coating at a temperature of about 120° C. or less.

DETAILED DESCRIPTION OF THE PREFERRED EMBODIMENTS

In the description which follows, the term "thermoplast plastisol" refers to a plastisol which is unblended with the polyurethane of the invention. When the thermoplast plastisol is blended with the polyurethane of the invention, the blend is sometimes referred to as a "reactive plastisol" or "plastisol composition".

The polyurethane of the invention is a storage stable composition in which the isocyanate prepolymer is temporarily masked or blocked with an oxime blocking agent. The resulting blocked isocyanate prepolymer can be mixed with an amine curing agent to form a one-package system that will remain stable or unreactive for storage at ambient temperatures. When it is heated to higher temperature, such as 120° C., the components of the one package system react to form a cross-linked product. The blocked isocyanate polyurethane compositions of the invention are compatible with thermoplast plastisols and therefore when mixed with such plastisols and baked at 120° C., yield coatings having superior film properties such as adhesion to substrates (i.e. electrodeposition coatings), abrasion resistance, tensile strength, modulus and elongation.

The blocked isocyanate polyurethanes are formed from a blocked isocyanate prepolymer, a diamine curing agent and a catalyst. The blocked isocyanate prepolymer is formed from an aliphatic, sterically hindered diisocyanate having the formula

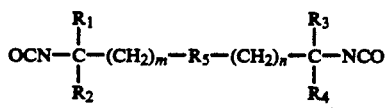

wherein $R_1$–$R_4$ may be the same or different and are selected from the group consisting of $C_1$–$C_6$ alkyl which can be linear or branched, $R_5$ is a phenylene or naphthalene ring which is unsubstituted or substituted by one or more $C_1$–$C_{12}$ linear or branched chained alkyl groups or halo groups, and m and n are each integers from 0 to 6.

In a preferred embodiment, the blocked isocyanate prepolymer is prepared from a polytetramethylene oxide based diol (PTMO-diol), meta-tetramethylxylene diisocyanate (m-TMXDI) and methyl ethyl ketoxime. The blocked isocyanate prepolymer is formed in a two-step, one-batch process. In a first step, one mole of a 1000 molecular weight polytetramethylene oxide glycol (Terathane 1000 from E.I. Dupont de Nemours) is first reacted with 2 moles of m-tetramethylxylene diisocyanate (m-TMXDI from American Cyanamid). In the second step, the reaction mixture is reacted with 2 moles of methyl ethyl ketoxime to temporarily block the isocyanate terminal end groups.

m-TMXDI has been found to be the best diisocyanate for the preparation of the blocked isocyanate prepolymer because it gives the best balance of properties with respect to good storage stability, curability at 120° C. or less, improved abrasion resistance and adhesion to an E-coat when mixed with a thermoplast plastisol, and in particular when mixed with a polyvinylchloride plastisol.

Although blocked isocyanate prepolymers made from toluene diisocyanate (TDI) and methylene diphenyl diisocyanate (MDI) impart excellent abrasion resistance and adhesion to thermoplast plastisols cured at 120° C., storage stability is very poor, i.e, formulated samples tend to gel upon storage at 43° C. for 3 days. The cycloaliphatic diisocyanates, such as isophorone diisocyanate (IPDI) and dicyclohexylmethane diisocyanate (Desmodur W), on the other hand, give blocked isocyanate prepolymers that are very storage stable with an amine curing agent but do not form cross-linkable coatings with thermoplast plastisols when cured at 120° C. due to their slower reactivity.

In formulating the polyurethane prepolymer, polytetramethylene oxide based polyols are preferred. There may, however, be used a variety of polyether and polyester polyols in the preparation of the polyurethane prepolymer.

Suitable polyether polyols include products obtained by the addition polymerization of one or more alkylene oxides such as ethylene oxide, propylene oxide, butylene oxide, or styrene oxide, to one or more polyols as the initiator, such as ethylene glycol, diethylene glycol, propylene glycol, glycerol, trimethylol propane, hexanetriol, pentaerythritol, sorbitol, sucrose, mannitol, sorbide, mannitan, or sorbitan, or to amines such as ethylene diamine, propylene diamine, or ethanolamine under alkaline or acidic conditions. These polyether polyols may be prepared in a known manner as described in the publication entitled "High Polymer Vol. XIII, Polyethers Part 1" (1963) by Norman G. Gaylord, published by Interscience Publishers, New York, N.Y. The molecular weight of the polyether polyols may be varied depending upon the purpose, and is generally selected from the range of about 300 to about 3,000, preferably from about 400 to about 2,000.

Examples of useful polyester polyols include the product obtained by the reaction of one or more polyols such as ethylene glycol, propylene glycol, diethylene glycol, triethylene glycol, butylene glycol, trimethylol propane, glycerol, hexanetriol or pentaerythritol with one or more polycarboxylic acids such as oxalic acid, succinic acid, glutaric acid, adipic acid, pimetic acid, suberic acid, azelaic acid, sebacic acid, isophthalic acid, terephthalic acid, or their acid anhydrides. These polyester polyols are prepared in a known manner as described in the publication entitled "Polyesters and Their Application", April 1959, published by Bjorksten Research Lab., Inc., New York, N.Y. The molecular weight of the polyester polyols may vary depending upon the purpose desired, and is generally selected from the range of about 300 to about 3,000, preferably from about 400 to about 2,000.

The heretofore commonly used polypropylene oxide polyols are less preferred in the present invention because blends of thermoplast plastisols with blocked isocyanate prepolymers prepared with these polyols tend to form cured coatings that are particularly very "cheesy" with poor film integrity, even when the amount of thermoplast in the blend is very low.

Polycaprolactone based polyols also have been known to be compatible with PVC. However, blocked isocyanate prepolymers prepared with polycaprolactones tend to be of very high viscosity and storage stability and curability at 120° C. appear to be poorer than prepolymers prepared from PTMO based polyols.

Copolymers based on polytetramethylene oxide and ethylene oxide can also be used as long as the ethylene oxide content is not so high as to affect the wet abrasion resistance of the coatings, since ethylene oxide based polymers are water soluble.

The polytetramethylene oxide based polyols suitable for use in this invention can be of any molecular weight ranging from 600 to 10,000, preferably from 650 to 3000. Examples of such polytetramethylene oxide polyols are the previously mentioned Terathane series from E.I. Dupont de Nemours.

In order to achieve storage stability of the isocyanate prepolymer with the diamine curing agent, the isocyanate terminal groups on the prepolymer must be masked or blocked with a ketoxime. By doing this, the blocked isocyanate prepolymer is stable in admixture with the amine curing agent upon storage to form a one-package system. Upon heating, in this case at 120° C. or less, the ketoxime blocking agent will be released and deblock the isocyanate groups, and the free isocyanate groups can then react with the diamine curing agent to form the final cross-linked coating.

The ketoxime blocking agent used to form the blocked isocyanate prepolymer can be selected from a wide variety of ketoximes. Many suitable isocyanate blocking agents have been described in the literature (e.g., Z. W. Wicks, Progress in Organic Coatings, 3 (1975), 73-99). The choice of ketoxime is not critical and depends mainly on the cost of the starting ketone, and in part on the volatility of the oxime. Among the oximes which can be used in making the ketoxime-blocked isocyanates are acetone oxime, 2-butanone oxime, 3-methyl-2-butanone oxime, 2-pentanone oxime, 3-pentanone oxime, 4-methyl-2-pentanone oxime, 2-heptanone oxime, 3-heptanone oxime, cyclohexanone oxime, acetophenone oxime, and the like.

Especially preferred ketoximes are the various lower dialkyl ketoximes. Of these, methyl ethyl ketoxime has been found to be the most suitable blocking agent because it imparts both good storage stability to the system and good curability at 120° C. Phenol and caprolactam based blocking agents give good storage stability but generally require a temperature higher than 130° C. for complete curing.

Preferred diamine curing agents are the various cycloaliphatic amines such as isophorone diamine, cyclohexyldiamine and bis(p-amino-dicyclohexyl)methane. These diamines provide the best physical properties with respect to curing temperature and storage stability.

The diamine curing agent that was found to be most effective in providing good storage stability and good curability at 120° C. for the sterically hindered, blocked isocyanate prepolymer is 4,4'-methylenebis-(2-methyl)-cyclohexylamine (commercially available from BASF as Laromin C260). Use of this curing agent results in not only good storage stability and low temperature cure, but also superior film properties.

Theoretically, any amine or hydroxyl containing compound could be used as a curing agent for the isocyanates. However, it has been found that aromatic amines, even though they give good storage stability, do not provide cure at temperatures lower than 130° C. Aliphatic amines, on the other hand, react too fast and hence result in poor storage stability.

A deblocking and curing catalyst is preferably included in the polyurethane composition. Such catalysts can be selected from a wide combination of compounds including dibutyl tin dilaurate, stannous octoate, tetraethylene pentamine and tertiary aliphatic amines containing at least two hydroxyl groups. The catalysts are generally added in a quantity of from about 0.1 to about 0.5 parts per hundred (based on the total weight of the blocked isocyanate prepolymer plus the curing agents). Suitable tertiary aliphatic amines containing at least two hydroxyl groups may also be used and include, for example, N-methyldiethanolamine, triisopropanolamine, triethanolamine, butyl dibutanolamine, propyl dipropanolamine, triisobutanolamine, N,N,N',N'-tetrakis(hydroxypropyl) ethylene diamine, N,N,N',N'-tetrakis(hydroxybutyl) ethylene diamine, N,N,N',N'-tetrakis(hydroxyethyl) ethylene diamine, N'-mono(hydroxyethyl)N,N',N'-tris(hydroxypropyl) ethylene diamine, and the like. In the curable coating composition of this invention the tertiary amino alcohol acts both as a cross-linking agent and simultaneously as a catalyst for releasing the blocked or masked polyisocyanate.

A preferred catalyst is dibutyl tin dilaurate.

The following reaction scheme illustrates the reaction forming the polyurethane of the invention using m-TMXDI as the sterically hindered diisocyanate.

panel, and heated at 120° C. for between 20 to 30 minutes to give the final cross-linked coating.

The thermoplast plastisol can be formed from a mixture of a thermoplastic polymer powder with a plasticizer. The thermoplastic polymer powder can be polyvinyl chloride or acrylic polymer, either or both of which can be a homopolymer or a copolymer, or the powder can be a blend of PVC with an acrylic polymer.

Polyvinyl chloride (PVC) and acrylic polymers suitable for plastisol applications are typically emulsion-polymerized or suspension-polymerized. The average particle size of the polymer powder also must be in the range of 0.3 microns to 200 microns. Too small of a particle size will lead to storage instability and hence gelling upon storage with the plasticizers. Too large a particle size will, on the other hand, lead to incomplete plasticization and poor film integrity.

Both PVC homopolymers and copolymers having molecular weights ranging from 60,000 to 2,000,000 are applicable in the invention. Commonly used PVC copolymers are vinyl chloride-vinyl acetate copolymers. Other components with PVC include vinylidene chloride, acrylonitrile, diethyl maleate, ethylene, propylene and other ester monomers.

Acrylic polymers can be homopolymers or copolymers prepared from methacrylate or acrylate-containing monomers. Useful molecular weights range from 40,000 to 2,000,000. Useful acrylic monomers include, for example, methyl acrylate and methacrylate, ethyl acrylate and methacrylate, n-propyl or isopropyl acrylate and methacrylate, butyl acrylate and metacrylate, 2-ethyl hexyl acrylate and methacrylate, cyclohexyl acrylate and methacrylate or hydroxyl alkyl acrylates and methacrylates, etc. Particularly useful are polymethyl methacrylate (PMMA) and copolymers of

REACTION SCHEME 1
PREPARATION OF THE BLOCKED ISOCYANATE PREPLOYMER

Step 1

HO—[CH$_2$CH$_2$CH$_2$CH$_2$O]$_{13}$—H    (Terathane 1000)

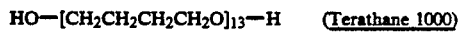

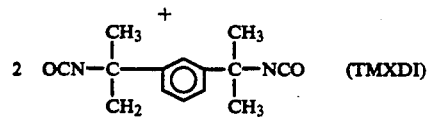

Step 2

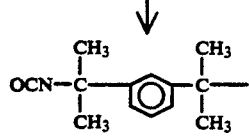

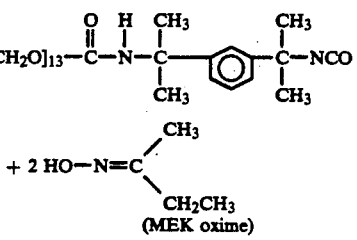
(MEK oxime)

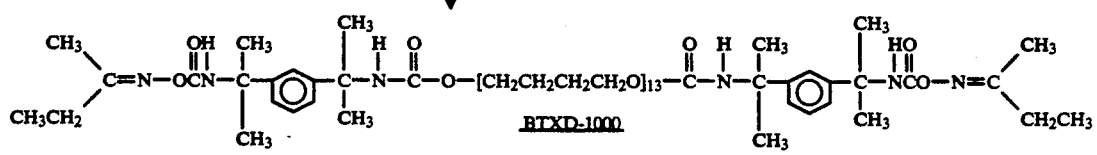

The blocked isocyanate polyurethane composition described above may be mixed or blended with different levels of thermoplast plastisols, applied to an E-coat methyl methacrylate with up to 25 weight percent butylmethacrylate.

A wide variety of plasticizers suitable for PVC plastisols and acrylic plastisols is available. These include the phthalates, adipates, benzoates, azelates, sebacates, glutarates, glycerol esters, glycol esters, butyrates, oleates, alkyds, phosphates, carbonates, trimellitates, citrates, stearates, polymeric esters, epoxidized oils, epoxy tallates, amide esters, sulfonamides or terpenes.

Examples of specific plasticizers for PVC include, but are not limited to, dioctyl phthalate, diisooctyl phthalate, diisononyl phthalate, diisodecyl phthalate, butyl benzyl phthalate, dipropylene glycol dibenzoate, N-ethyl o,p-toluene sulfonamide, di(2-ethyl hexyl) adipate, diisodecyl adipate, acetyl tri-n-butyl citrate, epoxidized soybean oil, and trimethyl pentanediol diisobutyrate.

Examples of suitable plasticizers for acrylic polymers include, but are not limited to, dibutyl phthalate, diisobutyl phthalate, diisononyl phthalate, diisooctyl phthalate, diisodecyl phthalate, diamyl phthalate, dibenzyl phthalate, butylbenzyl phthalate, dimethoxy-ethyl phthalate, diethoxy-ethyl phthalate, dibutoxy-ethyl phthalate, dibenzyl toluene, tricresyl phosphate, diphenyloctyl phosphate, triphenyl phosphate, diethyleneglycol dibenzoate, dipropyleneglycol dibenzoate, dibenzyl benzoate, diphenyl ether, acetyl tributyl citrate and other plasticizers that are compatible and storage stable with the acrylic polymer.

The thermoplast plastisols are typically mixtures of thermoplast powder with liquid plasticizers, inert fillers, extenders, rheological additives and heat stabilizers. Examples of fillers include calcium carbonate, calcium silicate, talc, clay, calcium sulfate, calcium oxide, titanium oxide, magnesium oxide, zinc oxide, molecular sieves and diatomaceous earth. Rheological additives can be silica based thixotropes or clay derivatives or organic thixotropes.

When practicing the instant invention to form a reactive plastisol composition, the composition comprises, on a 100 parts by weight thermoplast plastisol basis, from about 2 to about 100,000 parts by weight of polyurethane. That is, the reactive plastisol can contain from about 2% by weight to about 99% by weight of polyurethane, without significant loss of physical properties upon curing at 120° C. or less. Preferably, the amount of polyurethane in the thermoplast plastisol is between about 2 and about 50 parts by weight and most preferably between about 5 and about 30 parts by weight per 100 parts thermoplast plastisol.

The thermoplast plastisol usually has a particle size in the range from about 0.1 to about 1,500 microns. The reactive plastisols rapidly turn to a flexible or rubbery solid upon heating at a temperature above the fluxing point to provide suitable mechanical strength. They are then cured to an interpenetrating network at the same or more elevated temperature after fluxing. The curable polyurethane component of the reactive plastisol functions as a plasticizer and solvates the thermoplast plastisol at the fluxing temperature. Thereafter, at or above the fluxing temperature, the polyurethane forms a thermoset material which interpenetrates the plastisol.

In a preferred embodiment, the thermoplast plastisol is either PVC plastisol or polymethylmethacrylate (PMMA) plastisol. Alternatively, the plastisol can be a plastisol mixture of PVC and PMMA in a weight ratio of from about 10:90 to about 90:10 PVC:PMMA. Preferably the weight ratio is about 50:50.

In addition to the above components, the polyurethane/thermoplast plastisol may contain one or more desiccants. Use of a desiccant prevents foaming caused by the reaction of residual moisture with the isocyanate and the subsequent evolution of carbon dioxide in the composition.

The following examples are set out to explain, but expressly not to limit, the instant invention. Unless otherwise noted, all parts and percentages, both in the specification and the examples, are by weight.

EXAMPLE 1

Preparation of a blocked isocyanate prepolymer.

A blocked isocyanate prepolymer was prepared from the reactants as shown below with their respective weight ratios.

| Reactants | Parts by Weight (grams) |
| --- | --- |
| Terathane 1000* | 1000.0 |
| m-Tetramethylxylene diisocyanate# | 488.6 |
| Methylethyl ketoxime | 174.0 |
| Dibutyl tin dilaurate | 0.2 |

*Polytetramethylene oxide glycol, MW = 1000, commercially available from Dupont
m-TMXDI, commercially available from American Cyanamid The m-tetramethylxylene diisocyanate and dibutyl tin dilaurate were charged to a 2-liter resin kettle equipped with a thermometer and a mechanical stirrer under nitrogen purge. The Terathane 1000 was then added to the isocyanate/catalyst mixture under continuous stirring over a period of 5 hours at a rate such that the exotherm did not exceed 50° C. Vigorous stirring of the reaction mixture was then continued for 20–24 more hours until the isocyanate content has reached a half point of 1.25 equivalents of isocyanate/gram resin (This is determined by titration). At this point, half of the original isocyanate groups had reacted. The methylethyl ketoxime was then added to the reaction mixture over a period of 30 minutes or more so that the reaction exotherm would not raise the reaction temperature to more than 70° C. The reaction mixture was then kept stirred until all the isocyanates had reacted as indicated by IR analysis which showed no isocyanate peak at 2250cm$^{-1}$. The reaction was generally complete within 24 hours or less. The product was a clear, viscous liquid with a viscosity about 80,000 cps at 25° C.

COMPARATIVE EXAMPLE 1

Preparation of a blocked isocyanate prepolymer.

For comparative purpose, a blocked isocyanate prepolymer based on the aromatic diisocyanate MDI was prepared as follows.

| Reactants | Parts by Weight (grams) |
| --- | --- |
| Baytec ME-080* | 400.0 |
| Methylethyl ketoxime | 70.4 |
| Dipropylene glycol dibenzoate | 117.6 |

*An MDI capped polytetramethylene oxide prepolymer from Mobay.

The Baytec ME-080 and dipropylene glycol dibenzoate plasticizer were mixed together in a 1-liter resin kettle equipped with a mechanical stirrer, a thermometer and a nitrogen purge until a homogeneous mixture was obtained. Methylethyl ketoxime was then added slowly to the reaction mixture over a period of 30 minutes such that the reaction temperature would stay below 60° C. Vigorous stirring of the reaction mixture was then continued for about 4 more hours until the IR analysis did not show any isocyanate peak at 2250cm$^{-4}$, indicating all of the isocyanates had been blocked and the reaction was complete.

EXAMPLE 2

Preparation and comparison of the storage stability of one-package blocked isocyanate polyurethane mixtures.

Blocked isocyanate polyurethane mixtures were formulated as follows. The blocked isocyanate prepolymer was mixed with the diamine curing agent and the catalyst as shown below.

| MIXTURE A | |
|---|---|
| Components | Parts by Weight (grams) |
| Prepolymer from Example 1 | 100.0 |
| Laromin C260* | 14.3 |
| Dibutyl tin dilaurate | 0.57 |

*4,4'-methylenebis(2-methyl)-cyclohexylamine from BASF

| MIXTURE B | |
|---|---|
| Components | Parts by Weight (grams) |
| Prepolymer from Comparative Example 1 | 80.6 |
| Laromin C260 | 13.2 |
| Dibutyl tin dilaurate | 0.5 |

When both mixtures A and B were subjected to heat ageing at 43° C. for 3 days, mixture A still remained a workable, high viscosity liquid but mixture B became a solid gel. Upon storage for 3 months at room temperature, while mixture A (diluted with 50% of dipropylene glycol dibenzoate) showed a viscosity change from 6,500 to 34,500 cps, mixture B (which was also diluted with 50% dipropylene glycol dibenzoate) completely gelled. Mixture A remained a workable liquid for at least 4 months storage at ambient temperature.

EXAMPLE 3

Formulation of a blocked isocyanate polyurethane/PVC plastisol composition.

A PVC plastisol control formulation was prepared as shown in the table below. All the ingredients were combined together and mixed in a Hobart mixer until a smooth and homogeneous texture was obtained.

| MIXTURE C: PVC Plastisol Control Formulation | |
|---|---|
| Components | Parts by Weight (grams) |
| Diisononyl phthalate | 283.5 |
| o,p-ethyl toluene sulfonamide | 17.8 |
| Dipropylene glycol dibenzoate | 53.0 |
| Paraffin | 26.4 |
| Polyvinyl chloride homopolymer | 44.1 |
| Vinyl chloride/5% vinyl acetate copolymer | 187.3 |
| Calcium oxide | 11.0 |
| Zinc oxide | 2.0 |
| Titanium oxide | 4.4 |
| Calcium carbonate | 370.5 |

Various concentrations of mixture A were then combined with the PVC plastisol control, mixture C, mixed well, passed through a three-roll mill and then applied at a thickness of about 500 microns on 4 in. x 12 in. electrodeposition (E-coat) panels. The coated panels were then heated in an oven at 120° C. for 30 minutes for curing. After cooling overnight at ambient temperature, the panels were then subjected to abrasion resistance testing. The abrasion resistance was determined by dropping hexagonal nuts through a PVC pipe onto a coated panel positioned at a 30 degree angle from the dropping direction. The abrasion resistance is recorded as the number of kilograms of nuts required to abrade the coating i.e. until the coating first started to chip away from the E-coat surface. The results are shown in the Table below.

TABLE

Abrasion resistance of Mixture C (PVC plastisols) modified with Mixture A (Blocked Isocyanate Polyurethane Composition

| Sample No. | Wt % PU* | Thickness (microns) | Nut Fall Abrasion (kg) | |
|---|---|---|---|---|
| | | | Initial | After water soak# |
| 1 | 0 | 540 | 55 | 3 |
| 2 | 20 | 530 | 72 | 20 |
| 3 | 30 | 500 | 90 | 25 |
| 4 | 40 | 525 | 120 | 85 |
| 5 | 50 | 506 | 160 | 180 |
| 6 | 60 | 500 | 165 | >200 |
| 7 | 80 | 500 | >200 | >200 |
| 8 | 100 | 500 | >200 | >200 |
| 9 | 100 | 300 | 170 | 160 |
| 10 | 100 | 200 | 53 | 54 |

*Wt % PU: Weight percent of Mixture A: polyurethane
Coated and cured panels were soaked in water at 43° C. for 10 days, removed from water and then the abrasion test was performed within 2-5 hours.

From the Table, it can be seen that the blocked isocyanate polyurethane composition of the invention had improved the abrasion resistance of the PVC plastisol significantly, even after water soaking.

The adhesion of these coatings on the E-coat panels was also excellent and due to the excellent adhesion, brass screen adhesion tests could not be performed because the brass screens were torn off and the coating could not be removed from the E-cost test coupons.

The PVC plastisol/polyurethane blends as shown in the Table also exhibited good storage stability. For example, Sample No. 3 in the Table has a viscosity increase of only from 60,000 cps initially to 73,500 cps after 3 days ageing at 43° C. On the other hand, a similar formulation, where the PVC plastisol of Mixture C was formulated with 30 weight percent of mixture B (where the blocked isocyanate prepolymer was prepared from MDI) showed a increase in viscosity from 58,500 cps, initially, to 308,000 cps after ageing for 3 days at 43° C.

Although the invention has been described in detail, in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A reactive plastisol composition, comprising:
   (A) a one component, solventless, storage stable, low temperature curable polyurethane composition, comprising:
   (1) a blocked isocyanate prepolymer consisting essentially of the reaction product of a polytetramethylene oxide diol, a diisocyanate having the formula

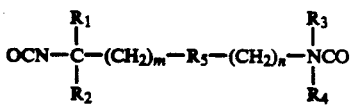

wherein $R_1$-$R_4$ may be the same or different and are selected from the group consisting of $C_1$-$C_6$ alkyl which is linear or branched, $R_5$ is a phenylene or naphthalene ring which is unsubstituted or substituted by one or more $C_1$-$C_{12}$ linear or branched chained alkyl groups or halo groups, and m and n are each integers from 0 to 6, and a ketoxime blocking agent; and (2) a curing agent containing a cycloaliphatic diamine; and (B) a thermoplast plastisol selected from the group consisting of plastisols of polyvinyl chloride, acrylic homo- and copolymers, and mixtures thereof.

2. A reactive plastisol composition according to claim 1, wherein the reactive plastisol contains, on a 100 parts by weight thermoplast plastisol basis, from about 2 to about 100,000 parts by weight of the polyurethane composition.

3. A reactive plastisol composition according to claim 1, wherein the reactive plastisol contains, on a 100 parts by weight thermoplast plastisol basis, from about 5 to about 30 parts by weight of the polyurethane composition.

4. A reactive plastisol composition according to claim 1, wherein the diisocyanate is m-tetramethylxylene diisocyanate and the ketoxime blocking agent comprises methyl ethyl ketone.

5. A reactive plastisol composition according to claim 4, wherein the thermoplast plastisol comprises polyvinyl chloride.

6. A reactive plastisol composition according to claim 4, wherein the thermoplast plastisol comprises polymethylmethacrylate.

7. A one component, solventless, storage stable, low temperature curable polyurethane composition, comprising:

(a) a blocked isocyanate prepolymer comprising the reaction product of a polytetramethylene oxide diol, a diisocyanate having the formula

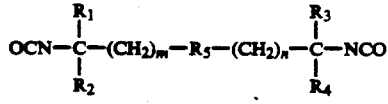

wherein $R_1$-$D_4$ may be the same or different and are selected from the group consisting of $C_1$-$C_6$ alkyl which is linear or branched, $R_5$ is a phenylene or naphthalene ring which is unsubstituted or substituted by one or more $C_1$-$C_{12}$ linear or branched chained alkyl groups or halo groups, and m and n are each integers from 0 to 6, and a ketoxime blocking agent; and (b) a curing agent containing a cycloaliphatic diamine.

8. A polyurethane composition according to claim 7, wherein the diisocyanate is selected from the group consisting of meta-substituted xylene diisocyanates.

9. A polyurethane composition according to claim 7, wherein the diisocyanate is m-tetramethylxylene diisocyanate.

10. A polyurethane composition according to claim 7, wherein the polytetramethylene oxide diol has a molecular weight of from about 600 to about 10,000.

11. A polyurethane composition according to claim 8, wherein the polytetramethylene oxide diol has a molecular weight of from about 650 to about 3,000.

12. A polyurethane composition according to claim 7, wherein the ketoxime blocking agent comprises methyl ethyl ketoxime.

13. A polyurethane composition according to claim 7, wherein the curing agent comprises a cyclohexyldiamine.

14. A polyurethane composition according to claim 13, wherein the curing agent is 4,4'-methylenebis(2-methylcyclohexylamine).

15. A polyurethane composition according to claim 7, further including a polyurethane curing catalyst.

16. A polyurethane composition according to claim 15, wherein the curing catalyst is dibutyl tin dilaurate.

17. A polyurethane composition according to claim 7, wherein the diisocyanate is m-tetramethylxylene diisocyanate and the ketoxime blocking agent comprises methyl ethyl ketoxime.

18. A method for coating a metal substrate subject to corrosion, comprising the steps of coating the substrate with a reactive plastisol composition, comprising:

(A) a one component, solventless, storage stable, low temperature curable polyurethane composition, comprising:

(1) a blocked isocyanate prepolymer comprising the reaction product of polytetramethylene oxide diol, a diisocyanate having the formula

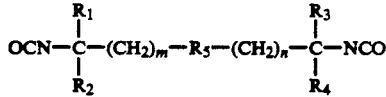

wherein $R_1$-$R_4$ may be the same or different and are selected from the group consisting of $C_1$-$C_6$ alkyl which is linear or branched, $R_5$ is a phenylene or naphthalene ring which is unsubstituted or substituted by one or more $C_1$-$C_{12}$ linear or branched chained alkyl groups or halo groups, and m and n are each integers from 0 to 6, and a ketoxime blocking agent; and (2) a curing agent containing a cycloaliphatic diamine; and (B) a thermoplastic plastisol selected from the group consisting of plastisols of polyvinyl chloride, acrylic homo- and copolymers, and mixtures thereof; and curing the coating by heating at a temperature of no more than about 120° C., thereby forming a polymeric coating.

19. A method according to claim 18, wherein the reactive plastisol contains, on a 100 parts by weight thermoplast plastisol basis, from about 2 to about 100,000 parts by weight of the polyurethane composition.

20. A method according to claim 18, wherein the reactive plastisol contains, on a 100 parts by weight thermoplast plastisol basis, from about 5 to about 30 parts by weight of the polyurethane composition.

21. A method according to claim 18, wherein the diisocyanate is selected from the group consisting of meta-substituted xylene diisocyanates.

22. A method according to claim 18, wherein the diisocyanate is m-tetramethylxylene diisocyanate.

23. A method according to claim 18, wherein the polytetramethylene oxide diol has a molecular weight of from about 600 to about 10,000.

24. A method according to claim 18, wherein the polytetramethylene oxide diol has a molecular weight from about 650 to about 3,000.

25. A method according to claim 18, wherein the ketoxime blocking agent comprises methylethyl ketoxime.

26. A method according to claim 18, wherein the curing agent comprises a cyclohexyldiamine.

27. A method according to claim 26, wherein the curing agent is 4,4'-methylenebis(2-methyl cyclohexylamine).

28. A method according to claim 18, wherein the urethane composition further includes a polyurethane curing catalyst.

29. A method according to claim 28, wherein the curing agent catalyst is dibutyl tin dilaurate.

* * * * *

UNITED STATES PATENT AND TRADEMARK OFFICE
CERTIFICATE OF CORRECTION

PATENT NO. : 5,284,918
DATED : February 8, 1994
INVENTOR(S) : Huynh-Tran et al.

It is certified that error appears in the above-indentified patent and that said Letters Patent is hereby corrected as shown below:

Column 13, Claim 7, line 54, $[R_1-D_4]$ --$R_1-R_4$--.

Signed and Sealed this

Twenty-first Day of June, 1994

Attest:

BRUCE LEHMAN

*Attesting Officer*     *Commissioner of Patents and Trademarks*